United States Patent
Linke et al.

(10) Patent No.: US 9,327,917 B2
(45) Date of Patent: May 3, 2016

(54) DEVICE FOR SINGULATING AND PASSING ON UPRIGHT CONTAINERS

(71) Applicant: Uhlmann Pac-Systeme GmbH & Co. KG, Laupheim (DE)

(72) Inventors: Roberto Linke, Neu-Ulm (DE); Hans-Martin Poehler, Laichingen (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 0 days.

(21) Appl. No.: 14/682,341

(22) Filed: Apr. 9, 2015

(65) Prior Publication Data

US 2015/0291370 A1 Oct. 15, 2015

(30) Foreign Application Priority Data

Apr. 11, 2014 (EP) .................................. 14164366

(51) Int. Cl.
| | |
|---|---|
| B65G 47/84 | (2006.01) |
| B65G 47/26 | (2006.01) |
| B65G 47/71 | (2006.01) |
| B65G 37/00 | (2006.01) |
| B65G 47/82 | (2006.01) |

(52) U.S. Cl.
CPC .............. *B65G 47/846* (2013.01); *B65G 37/00* (2013.01); *B65G 47/71* (2013.01); *B65G 47/82* (2013.01)

(58) Field of Classification Search
CPC ...... B65G 47/80; B65G 47/82; B65G 47/846; B65G 29/00
USPC ......... 198/482.1, 483.1, 450, 459.2, 441, 442
See application file for complete search history.

(56) References Cited

U.S. PATENT DOCUMENTS

| | | | | |
|---|---|---|---|---|
| 2,273,509 | A | | 2/1942 | Braren |
| 2,770,349 | A | * | 11/1956 | Nordquist ............... B65G 47/71 198/439 |
| 2,827,998 | A | * | 3/1958 | Breeback ............... B65G 47/71 198/441 |
| 3,098,552 | A | * | 7/1963 | Schulz .................... B65B 35/46 198/439 |
| 3,967,717 | A | | 7/1976 | Bauer |
| 4,274,533 | A | * | 6/1981 | Abe ...................... B65G 47/846 198/447 |
| 4,441,878 | A | * | 4/1984 | Harry .................... B29C 49/421 198/468.8 |
| 7,219,521 | B1 | * | 5/2007 | Eldredge ............... B21B 43/003 198/450 |
| 2011/0308915 | A1 | | 12/2011 | Regner et al. |

FOREIGN PATENT DOCUMENTS

| | | |
|---|---|---|
| FR | 2.205.463 | 5/1974 |
| GB | 1 397 357 | 6/1975 |

OTHER PUBLICATIONS

European Search Report for EP 14164366 (Sep. 22, 2014).

* cited by examiner

*Primary Examiner* — James R Bidwell
(74) *Attorney, Agent, or Firm* — Brinks Gilson & Lione

(57) ABSTRACT

A device for singulating and passing on upright containers preferably comprises a feed device for transporting the containers in a single row and a singulation unit having a first star wheel and a second star wheel, each of which comprises receiving pockets to accept, when in a first and second receiving position, the containers being transported to them and to transport these containers to a first and second discharge position. The star wheels comprise parallel rotational axes but opposite rotational directions. In addition, the device comprises a pusher unit, which comprises at least one plunger, which, in the area of the first and second discharge position, is movable back and forth in a direction parallel to the rotational axes of the star wheels and through the associated receiving pockets to push the containers out of the receiving pockets of the star wheels and into product holders.

19 Claims, 11 Drawing Sheets

DEVICE FOR SINGULATING AND PASSING ON UPRIGHT CONTAINERS

RELATED APPLICATIONS

The present patent document claims the benefit of priority to European Patent Application No. EP 14164366.8, filed Apr. 11, 2014, the entire contents of which are incorporated herein by reference.

FIELD AND BACKGROUND OF THE INVENTION

The present disclosure relates to a device for singulating and passing on upright containers.

Devices of this type are used in, for example, the pharmaceutical industry to singulate bottles, ampuls, or other containers.

There are many different ways of configuring a device of this type for separating or singulating a transport stream of upright containers.

In a simple embodiment of a device for separating a transport stream of upright containers according to US 20110308915 A1, the containers are transported by a feed device in a single row to the distribution point, where they are divided into two transport streams by one or more rollers of plastic or metal, which are driven around a vertical rotational axis.

Other devices for separating and singulating a transport stream of upright containers use star wheels, which are provided with receiving pockets for the containers. A device of this type is known from U.S. Pat. No. 3,967,717, for example. This device serves to divide a single row of transported objects into three onward-leading rows. The device comprises two counter-rotating star wheels, which are coupled together. Each of the containers of the product stream being supplied in a single row is first taken up by a receiving pocket of one of the star wheels and transported to a discharge position. By means of pusher elements attached to the star wheels, the containers are pushed out of the receiving pockets at that point and deflected into one of the three onward-leading paths. This device is mechanically complicated and divides the product stream into only three horizontal branches, in the course of which further packaging steps for the containers must then also be carried out.

SUMMARY OF THE INVENTION

According to an aspect of the present disclosure a device for singulating and passing on upright containers is provided that provides an active introduction of the singulated containers into product holders provided for the purpose and which also has a robust and compact structure.

According to an aspect of the present disclosure, the device for singulating and passing on upright containers comprises a feed device for transporting the containers in a single row and a singulation unit with a first star wheel and a second star wheel. The star wheels comprise receiving pockets, which, when in a first or second receiving position, accept the containers being transported to them and then transport them to a first and second discharge position, wherein the star wheels comprise parallel rotational axes but opposite rotational directions. The device also comprises a pusher unit, which comprises at least one plunger, which, in the area of each discharge position, is movable back and forth in a direction parallel to the rotational axes of the star wheels and through the associated receiving pocket.

With this configuration, a robust and compact device is created, which serves to rapidly singulate upright containers and to actively introduce the singulated containers into the product holders provided for the purpose.

To provide an independent operation of the first star wheel and of the second star wheel, the first star wheel preferably comprises a first drive, and the second star wheel preferably comprises a second drive. The star wheels can therefore be actuated independently of each other, and any suitable pattern of movement of the two star wheels which ensures an optimal sequence of pickup, transport, and discharge of the containers can be configured.

It is especially advantageous for the first and second drives to be actuated in such a way that they produce a timed movement of the star wheels. This simplifies the process of introducing the containers into the receiving pockets of the star wheels and of discharging the containers from the pockets.

It is especially advantageous for the first and second drives to be actuated in such a way that the receiving pockets of the first star wheel are offset in time from receiving pockets of the second star wheel as the star wheels move between the receiving position and the discharge position. This assures that each receiving pocket of both star wheels will acquire a container in the receiving position and transport it to the discharge position.

So that the plunger does not become jammed or one of the star wheels damaged during the pushing operation, the first and second drives are stopped during the pushing operation in the discharge position.

To accelerate the throughput, the pusher unit preferably comprises two plungers.

For ergonomic reasons, it is advantageous for the two plungers to comprise a common, third drive.

The two plungers are preferably connected to each other by a rigid connecting web, as a result of which the movement of the two plungers in the discharge position of the first and second star wheels occurs simultaneously.

The third drive is preferably a cam drive.

To assure that the containers are pushed reliably into their product holders, the at least one plunger passes through, preferably completely through, the receiving pocket of the associated star wheel during the pushing operation.

The singulation unit preferably comprises a housing with side walls, a top, and a bottom, wherein the housing comprises a guide element with two guide surfaces, which laterally surround the star wheels in the area of, respectively, a third and a fourth quadrant of the star wheels, as a result of which the containers are guided in the third and fourth quadrants by the receiving pockets and the guide surfaces. This assures that, as the containers are being transported from the receiving position to the discharge position, they remain at all times in the receiving pockets of the associated star wheel.

The device comprises a support plate to serve as a support surface for the containers during the rotational movement.

So that the containers can slide out of the receiving pockets in the discharge positions, the support plate preferably has through-openings in the area of the discharge positions.

Alternatively, the support plate forms an ejection edge in the area of the discharge positions.

The device also preferably comprises a conveying means for product holders, into which the plungers push the containers during the pushing operation. The product holders into which the containers have been pushed are thus singulated and ready for further processing.

BRIEF DESCRIPTION OF THE DRAWINGS

Additional features and advantages of the present disclosure can be derived from the following description, which refers to the drawings.

DETAILED DESCRIPTION OF SPECIFIC EMBODIMENTS

Figure 1:
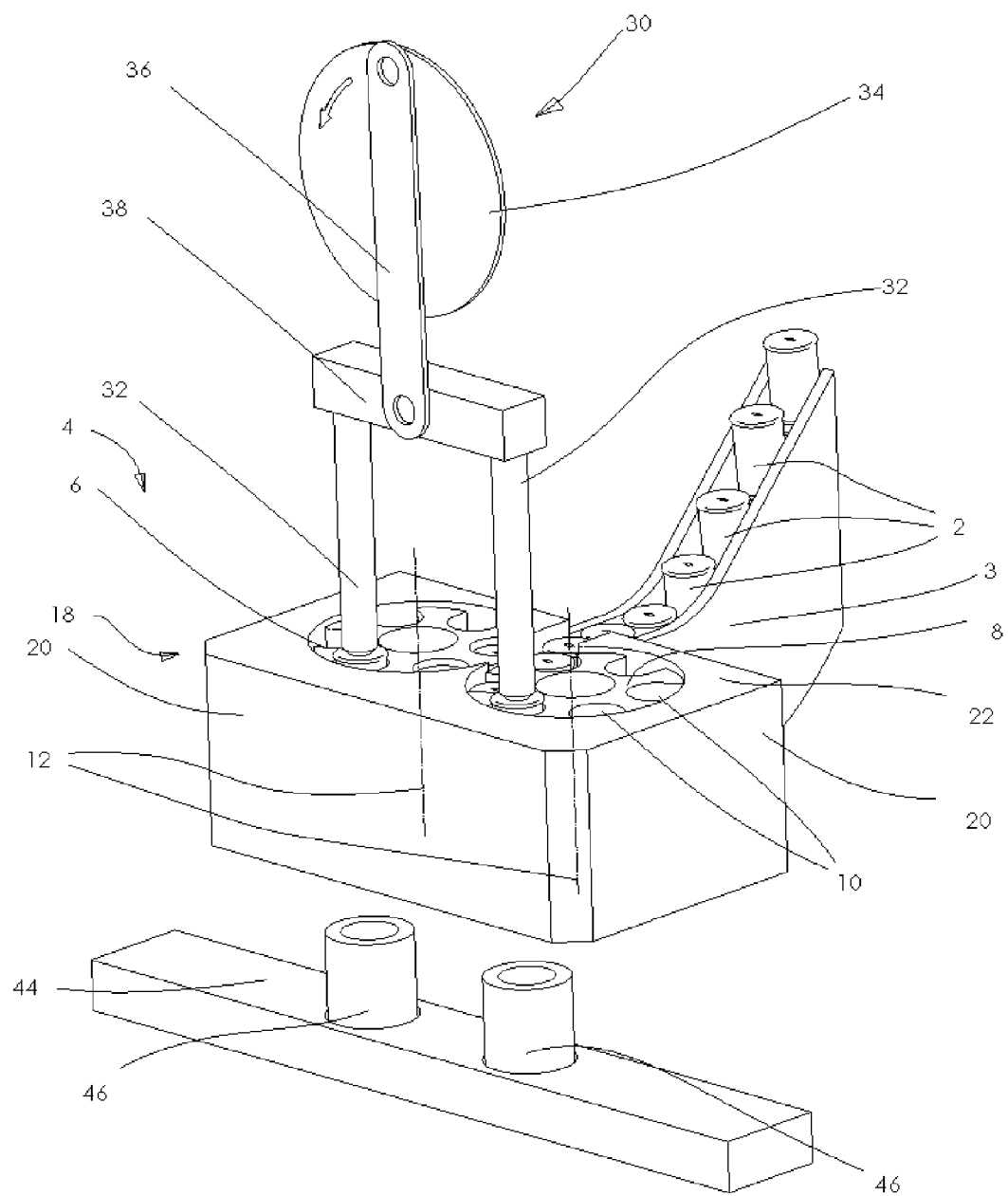
FIG. 1 shows a perspective view of an embodiment of the device according to the invention for singulating and passing on upright containers before the pusher unit has carried out a pushing operation.
Figure 2:
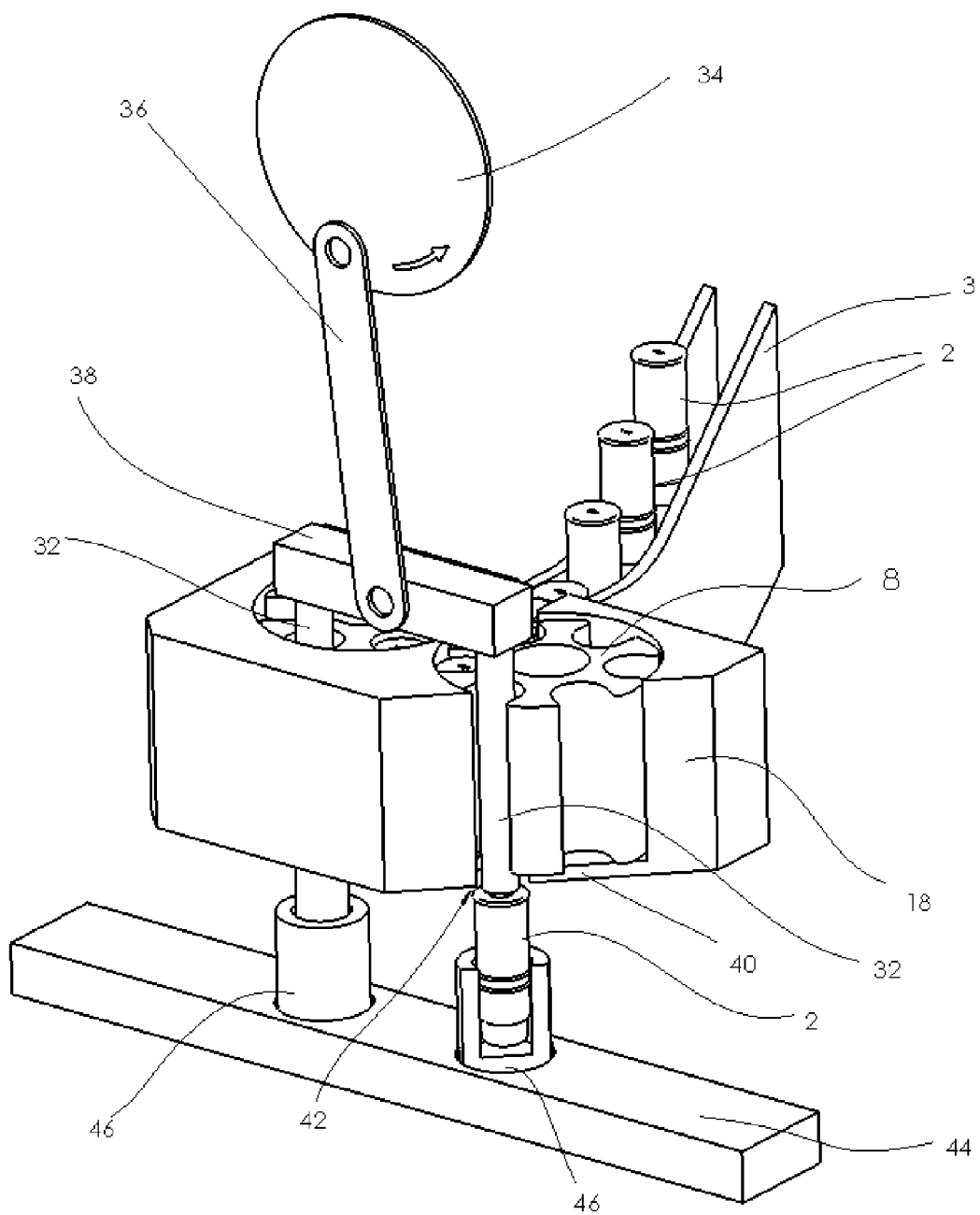
FIG. 2 shows a perspective view, in partial cross section, of the device of FIG. 1 during the pushing operation.
Figure 11:
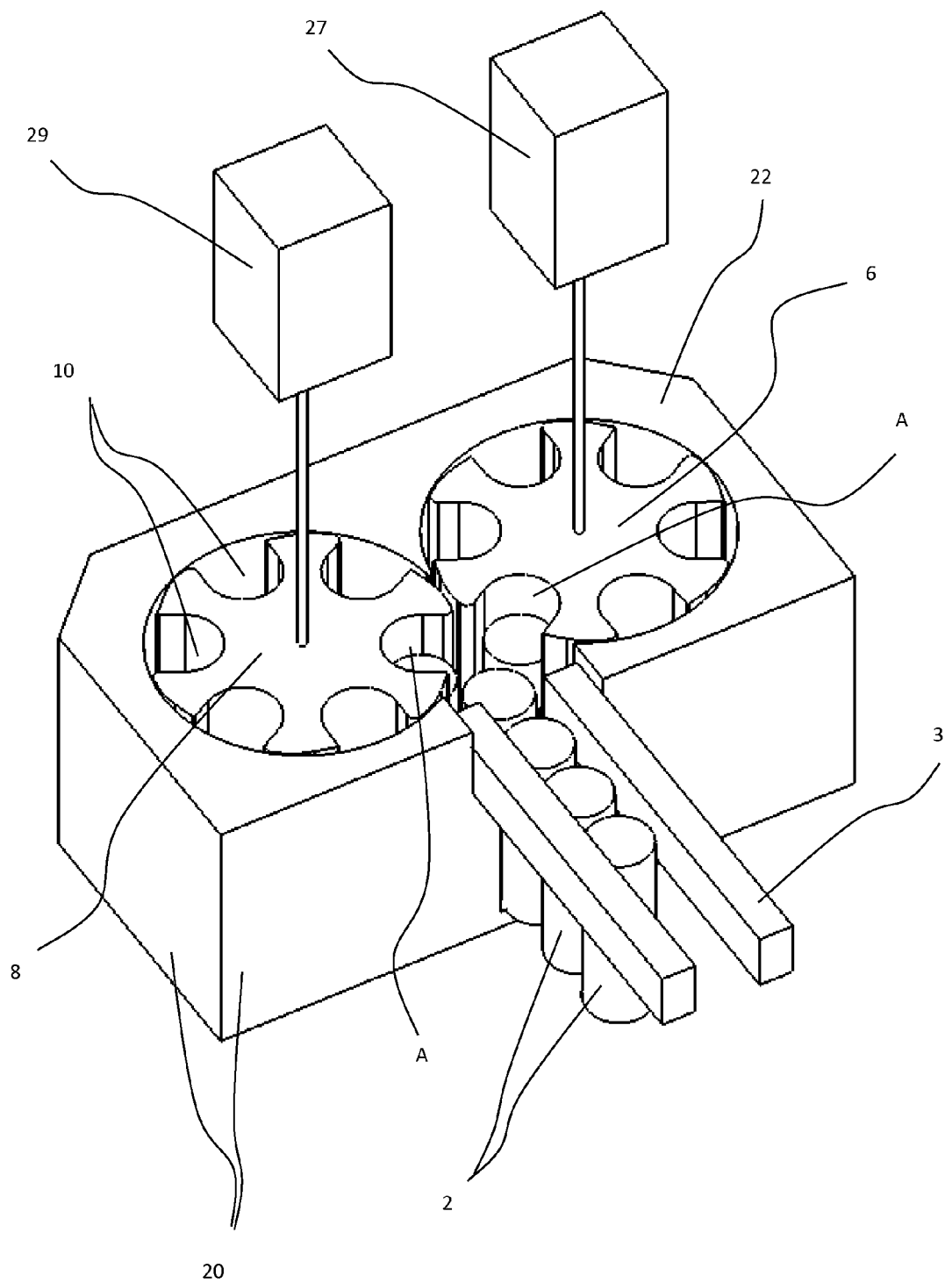
FIG. 11 shows a perspective view of the device of FIG. 1 without the pusher unit, seen from the container feed side.

FIGS. 1, 2, and 11 show the basic configuration of a device according to the present disclosure. Upright containers 2, such as bottles, ampuls, cartridges, or the like, are transported in a single row to a singulation unit 4 by means of a feed device 3. The feed device 3 can be configured as a collecting belt conveyor or as a chute, etc. The feed device 3 regulates the continuous resupply of containers 2 in such a way that each container 2 is pushed forward into the singulation unit 4 by the containers 2 coming up from the rear.

The singulation unit 4 comprises a first star wheel 6 and a second star wheel 8, wherein each of the two star wheels 6, 8 is equipped with receiving pockets 10 to accept the containers 2. In the example shown here, each of the star wheels 6, 8 comprises six receiving pockets 10. It is also possible, however, for each star wheel 6, 8 to comprise any other desired number of receiving pockets 10. The first star wheel 6 and the second star wheel 8 comprise parallel rotational axes 12, around which the star wheels 6, 8 rotate in opposite directions. In the example shown here, the first star wheel 6 rotates clockwise, the second star wheel 8 counterclockwise. The rotational axes 12 of the star wheels 6, 8 are substantially perpendicular to the direction in which the containers 2 enter the singulation unit 4. The star wheels 6, 8 are close together and form a triangular entrance area, which allows the containers 2, which are being transported in a single row by the feed device 3, to be divided between the first star wheel 6 and the second star wheel 8.

A container 2 is accepted into one of the receiving pockets 10 of the first star wheel 6 when the wheel is in a first receiving position A, and similarly a container 2 is accepted into one of the receiving pockets 10 of the second star wheel 8 when that wheel is in a second receiving position A. Because of the opposite rotational directions of the star wheels 6, 8, the containers 2 in the receiving pockets 10 of the one star wheel 6, 8 are facing the other star wheel as the wheels rotate and are in this way transported to their discharge positions B.

In the embodiment shown here, the singulation unit 4 comprises a block-shaped housing 18 with side walls 20, a top 22, and a bottom. In the housing 18, the two star wheels 6, 8 are supported in such a way that their rotational axes 12 are parallel to each other. The height of the side walls 20 and thus the height of the housing 18 is preferably greater than or equal to the height of the star wheels 6, 8, so that the star wheels 6, 8 are completely enclosed in the housing 18. The housing 18 also comprises a guide element 26 with guide surfaces 28, especially two guide surfaces 28. The guide surfaces 28 are curved, extend over the entire height of the housing 18 parallel to the rotational axes 12 of the star wheels 6, 8, and thus surround the associated star wheel 6, 8 over a certain arc of a circle. Because the guide surfaces 28 are arranged to be mirror images of each other, the guide element 26 has in cross section the form of a pointed mountain peak with rounded sides. If the numbering of the quadrants begins as usual at the upper right in the diagram and continues in the counterclockwise direction, the one guide surface 28 laterally surrounds the fourth quadrant of the first star wheel 6. The receiving position A of the first star wheel 6 will then be located in the first quadrant of the first star wheel 6. In analogous fashion, the second star wheel 8 is laterally enclosed by the other guide surface 28 of the guide element 26 in the third quadrant of the second star wheel 8, whereas the receiving position A is located in the second quadrant of this star wheel 8. In the fourth quadrant of the first star wheel 6 and in the third quadrant of the second star wheel 8, the containers 2 are thus guided not only by the receiving pockets 10 but also by the guide surfaces 28. This guarantees that the containers 2 remain in the receiving pockets 10 of the star wheels 6, 8 as they are being transported from the receiving position A to the discharge position B, which, in the present example, is arranged in the transition area between the third and fourth quadrants.

Alternatively or in addition, gripper or suction mechanisms can be provided in the receiving pockets 10 to hold the containers firmly in the receiving pockets 10 as they are being transported from the receiving position A to the discharge position B. These would have to be deactivated no later than the time at which the discharge position B is reached.

In a preferred embodiment, the first star wheel 6 comprises a first drive 27 (shown schematically in FIG. 11), and the second star wheel 8 comprises a second drive 29 (also shown schematically in FIG. 11). As a result, the star wheels 6, 8 can be actuated independently of each other, and thus the one star wheel 6, 8 can be stopped while the other star wheel 6, 8 continues to turn without change. The preferred way in which the first drive 27 and the second drive 29 function will be explained in greater detail below with reference to FIGS. 3-10.

The pusher unit 30 comprises at least one plunger 32, which, in the area of the respective discharge position B, can be moved back and forth parallel to the rotational axes 12 of the first star wheel 6 and of the second star wheel 8. As it executes the pushing operation, the plunger 32 passes completely through the receiving pocket 10 located in the discharge position B of the associated star wheel 6, 8.

In a preferred embodiment, the pusher unit 30 comprises, as shown, two plungers 32, wherein each plunger 32 is arranged in the area of the discharge position B, parallel to the rotational axes 12 of the star wheels 6, 8. The two plungers 32 preferably comprise a common third drive 34, which can be configured as a cam drive. The two plungers 32 are preferably connected to each other by a connecting web 38. The connecting web 38 is connected in turn to the third drive 34 by a conrod 36 or a slider crank. The conrod 36 is attached to the connecting web 38 in such a way that, when the third drive 34 moves, the two plungers 32 are moved either jointly downward or jointly upward.

Even though it is preferable to provide two plungers 32, it is also possible to provide only one plunger 32, which then must be moved back and forth between the two discharge positions B and execute the two pushing operations one after the other, first at the one, then at the other discharge position B. The movements of two plungers 32 can also be offset from each other. This would require different drives for the plungers 32.

During the rotation of the star wheels 6, 8, the containers 2 can be supported on a support plate 40. The support plate 40 can be permanently attached to the housing 18 of the singulation unit 4. It is also conceivable that the bottom surface 24 of the housing 18 itself could form the support plate 40. In the area of the discharge positions B, the support plate 40 comprises through-openings 42, through which the containers 2 drop. In another embodiment, the support plate 40 can end in the area of the discharge positions B and thus form an ejection edge.

Underneath the singulation unit 4, a conveying means 44 is arranged, which transports product holders 46. The product holders 46 are oriented so that their upper ends are near the bottom surface 24 of the housing 18. The containers 2 thus drop through the through-openings 42 and directly into the product holders 46 without jamming. The size of the product holders 46 is adapted to the diameters of the containers 2. The conveying means 44 can be configured in various ways. The conveying means 44 is preferably a conveyor belt or a turntable with receptacles for the product holders 46. The product holders 46 themselves can serve as the end packaging for the containers 2, or they can be subjected to further processing or packaging operations.

In FIG. 2, the discharge area B of the second star wheel 8 is completely visible in the cut-away part of the diagram. It can be seen that the plungers 32, now in their downward position, are pushing the containers 2 into the product holders 46 and thus pass completely through the receiving pockets 10 of the associated star wheels 6, 8. This pressing action improves the retention of the container 2 in the product holder 46, or it can activate a latching mechanism in the product holder 46.

The sequence of events during the actuation of the device according to the present disclosure will now be described with reference to FIGS. 3-10. The containers 2 are essentially first transported by the feed device 3 into the area of the receiving positions A and are accepted there into receiving pockets 10 of the star wheels 6, 8. A container is loaded into a receiving pocket 10 as a result of the moving or pushing effect of the containers 2 arriving from the rear of the feed device 3 on the containers in front. Then the containers 2 are transported by the oppositely directed rotations of the two star wheels 6, 8 to the discharge positions B. At the discharge positions B, the containers 2 drop into the product holders 46 and are then pushed firmly into the product holders 46 by the plungers 32. The movements of the star wheels 6, 8 occur in cycles, as will be explained in greater detail below.

Figure 3:
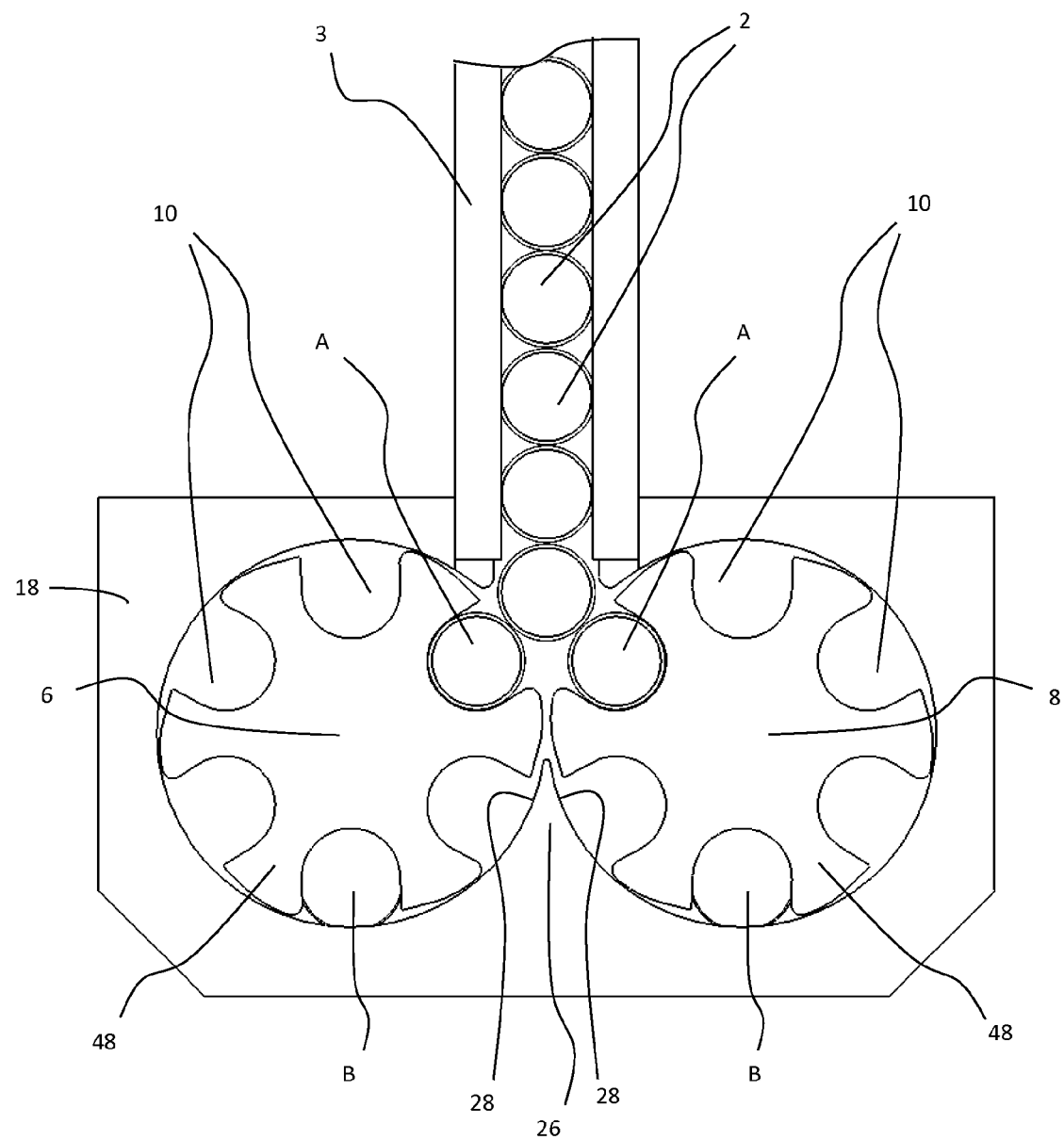
FIG. 3 shows a schematic top view of the device of FIG. 1 without the pusher unit, wherein the first and second star wheels are in a starting position, in which a receiving pocket of each star wheel is filled.

In FIG. 3, the two star wheels 6, 8 are in a starting position, in which a first receiving pocket 10 of the associated star wheel 6, 8 has already been loaded with a container 2. The discharge positions B, however are still empty. It can be seen in FIG. 3 that the containers 2 can be guided from the receiving position A to the discharge position B by rotational movement of the star wheels 6, 8 by a distance equal to two receiving pockets 10. Thus there will never be more than two receiving pockets 10 filled simultaneously in the same star wheel 6, 8. Of course, other configurations can be present depending on the structure of the star wheels 6, 8 and the locations of the receiving positions A and the discharge positions B.

Figure 4:
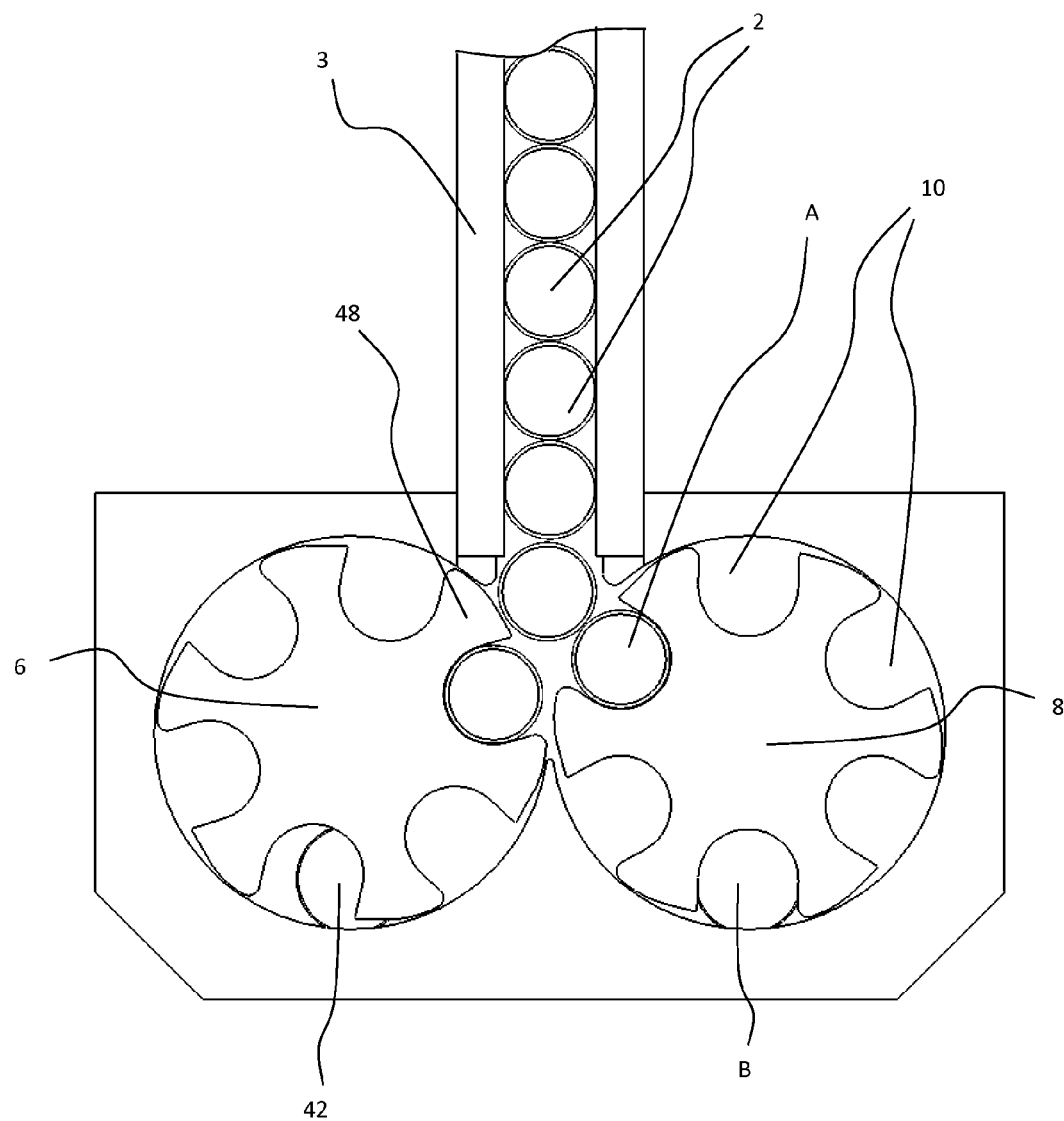
FIG. 4 shows a view similar to that of FIG. 3, wherein the first star wheel has already started to move, whereas the second star wheel is still stationary.

In FIG. 4, the first star wheel 6 with the loaded receiving pocket 10 has started to move in the clockwise direction. The second star wheel 8 is still in its starting position.

Figure 5:
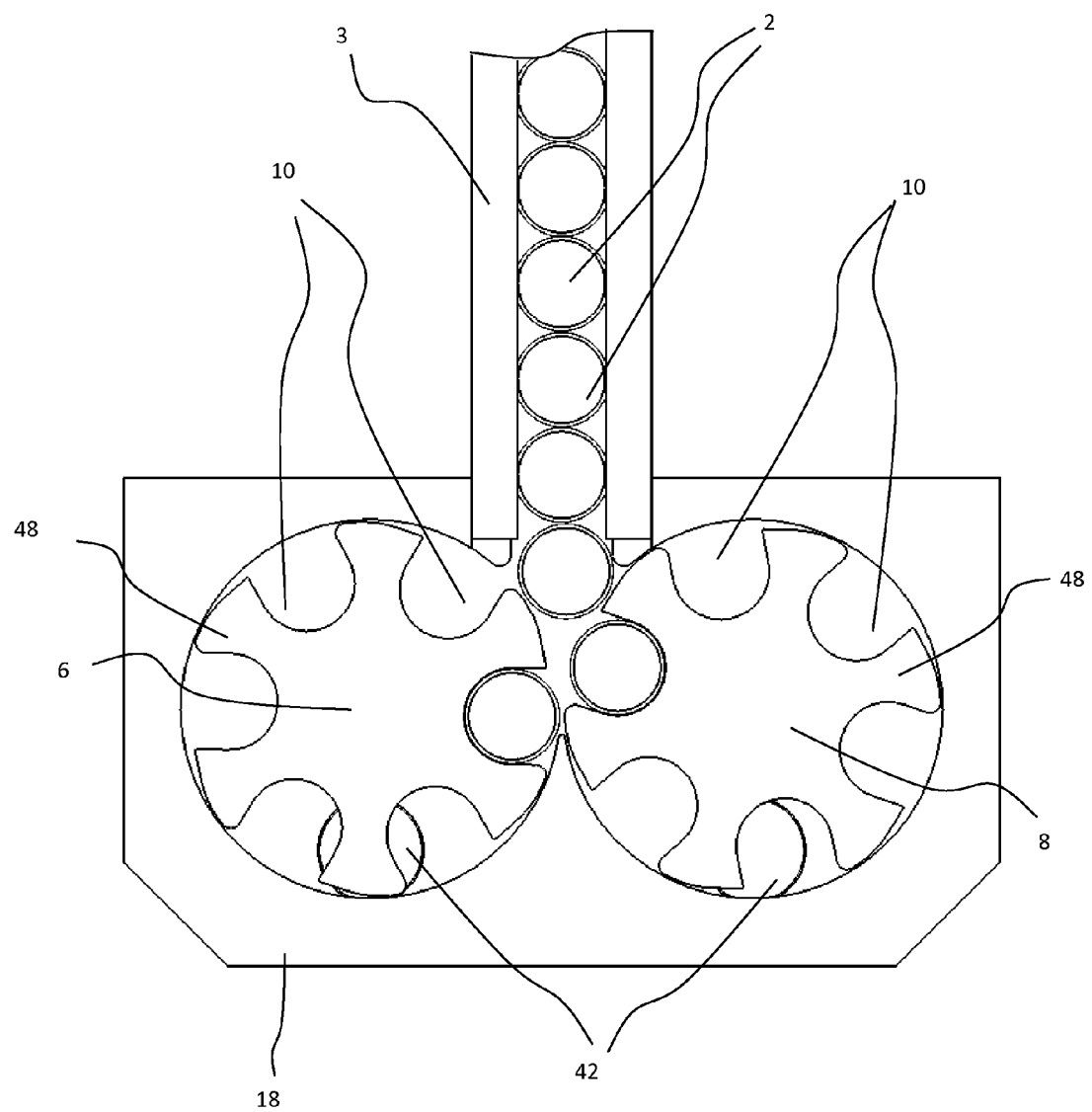
FIG. 5 shows a view similar to that of FIG. 4, wherein the second star wheel has now also started to move.

In FIG. 5, the second star wheel 8 has now also started to move, rotating in the counterclockwise direction. The rotation of the second star wheel 8 is offset in time from the rotation of the first star wheel 6 but proceeds preferably at the same speed.

Figure 6:
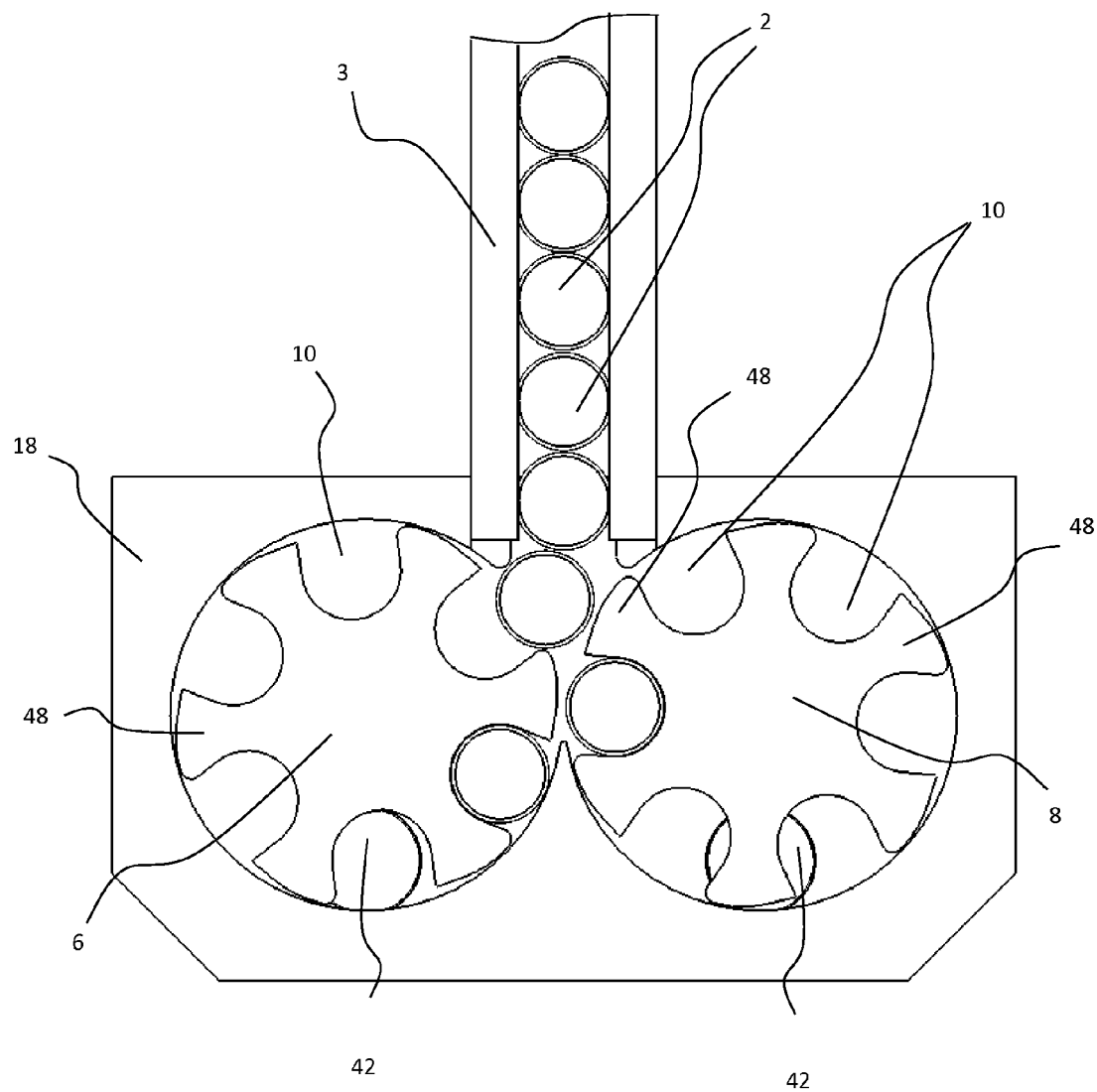
FIG. 6 shows a view similar to that of FIG. 5, wherein the first star wheel has rotated to such an extent that it can receive another container in another receiving pocket in the area of the receiving position.

In FIG. 6, the first star wheel 6 has rotated to such an extent that a second receiving pocket 10 can be loaded with another container 2. Shortly after reaching this position, the first star wheel 6 is stopped, while the second star wheel 8 continues to turn.

Figure 7:
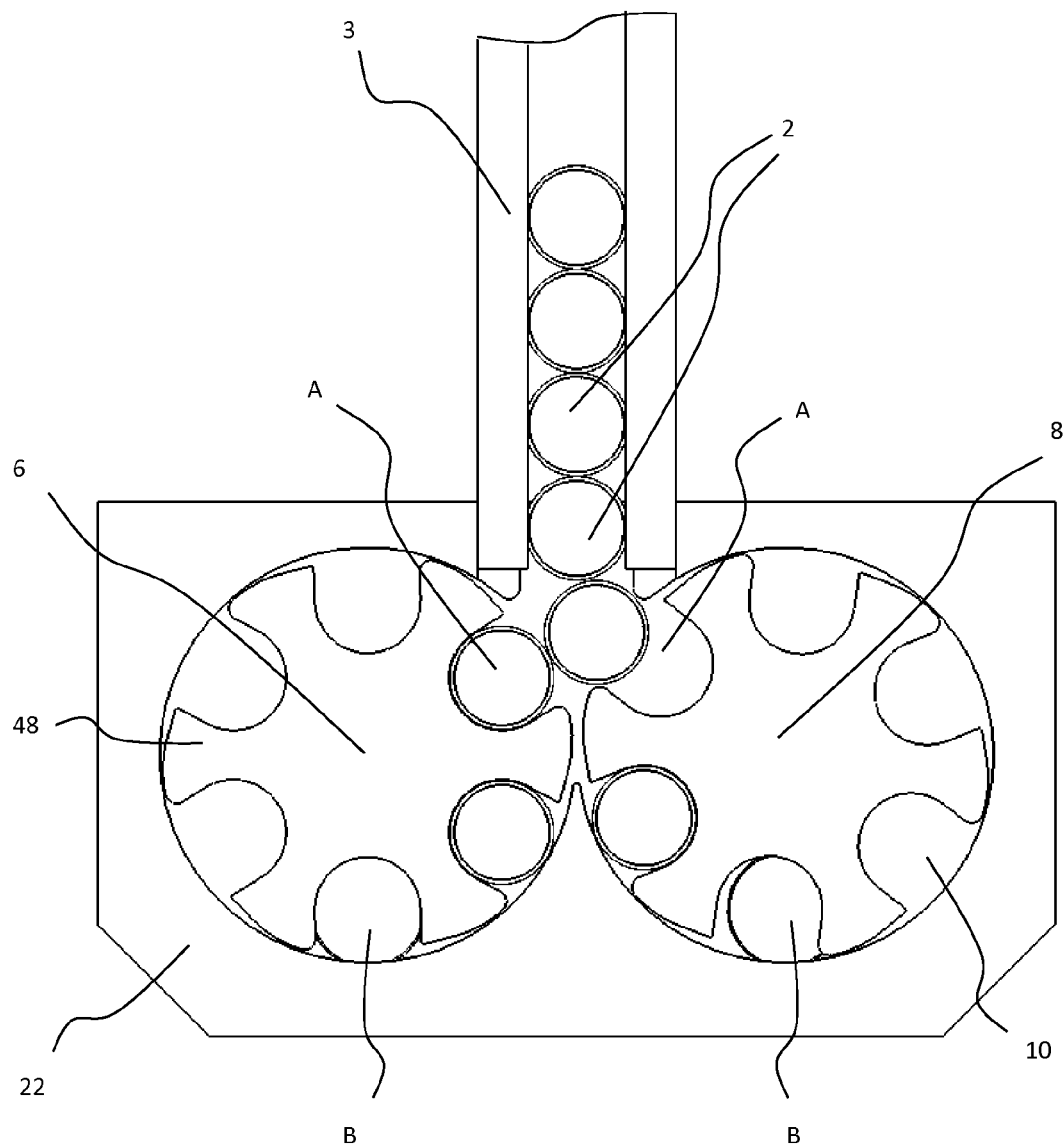
FIG. 7 shows a view similar to that of FIG. 6, wherein the second star wheel has been filled with a second container, and the position of the first star wheel has hardly changed versus the position in FIG. 6.
Figure 8:
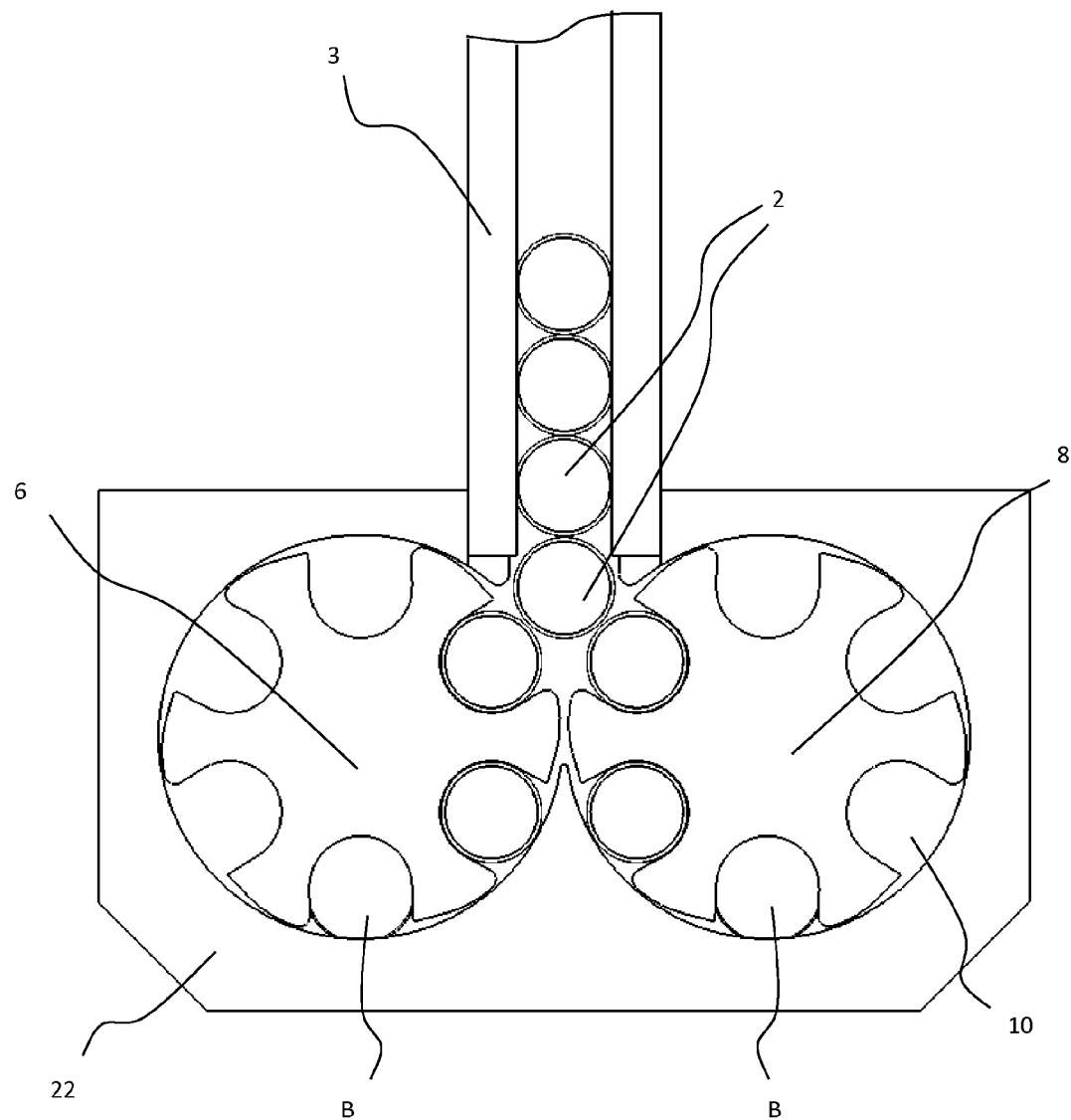
FIG. 8 shows a view similar to that of FIG. 7, wherein the first star wheel has rotated to such an extent that the first container in the first star wheel has reached the discharge position and has dropped out.
Figure 9:
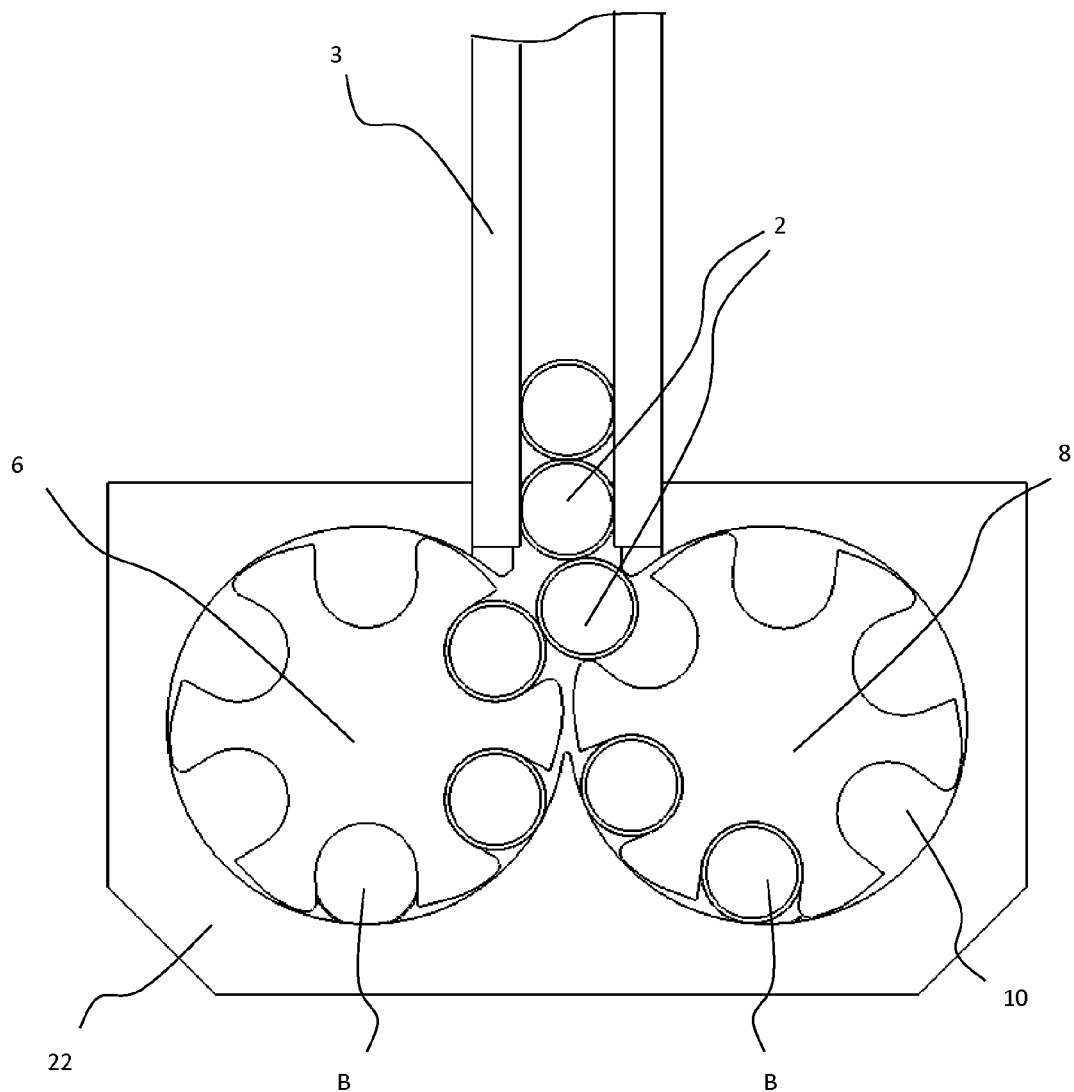
FIG. 9 shows a view similar to that of FIG. 8, wherein the second star wheel has also rotated to such an extent that the first container in the second star wheel has reached a point just before the discharge position.
Figure 10:
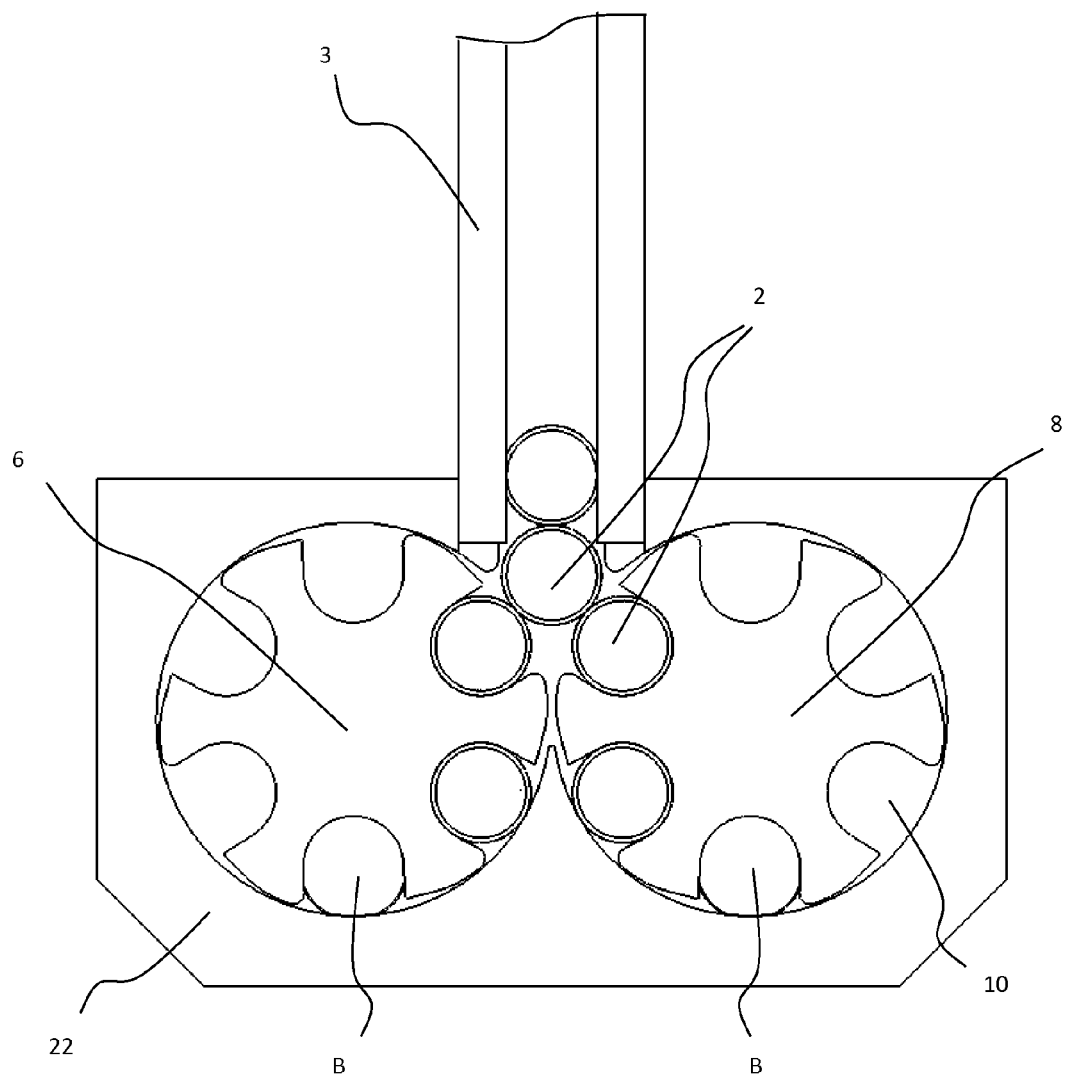
FIG. 10 shows a view similar to that of FIG. 9, wherein the second star wheel has rotated to such an extent that the first container in the second star wheel has also reached the discharge position and has also dropped out.

FIG. 7 shows a state in which the first star wheel 6 is standing still, while the second star wheel 8 continues to turn and a second receiving pocket 10, now in the receiving position A, of the second star wheel 8 is being loaded with a container 2. Shortly thereafter, the second star wheel 8 also stops, so that a mirror-symmetric arrangement of the two star wheels 6, 8 around the longitudinal center axis of the device is obtained.

The further rotation, first of the first star wheel 6 and then also of the second star wheel 8, brings the first containers 2, one after the other, into their discharge positions B (see FIGS. 8-10), where they drop through the through-openings 42 into the product holders 46. Then the containers 2 are pushed firmly, preferably simultaneously, into the product holders 46 by the plungers 32, as can be seen in FIG. 2.

The offset, cyclic course of the movements of the star wheels 6, 8, as illustrated in FIGS. 3-10, is especially advantageous with respect to the insertion of the containers 2 into the receiving pockets 10. After the receiving pocket 10 of the first star wheel 6 has been filled and a receiving pocket 10 of the second star wheel 8 is located in the receiving position A, the container 2 arriving from the rear slides along the container 2 already in the receiving pocket 10 of the first star wheel 6 and is thus guided into the receiving pocket 10 of the second star wheel 8 (see FIG. 7). If, however, a receiving pocket 10 of the first star wheel 6 is in the receiving position A and the second star wheel 8 is rotating, the container 2 moving up from the rear will slide along the web 48 formed between two successive receiving pockets of the second star wheel 8 and will thus be guided into the receiving pocket 10 of the first star wheel 6 (see FIG. 6). The same sequence also applies in reverse.

Of course, it also possible for the second star wheel 8 to rotate first and then for the first star wheel 6 to rotate. In addition, the rotational direction of the two star wheels 6, 8 can be reversed. Many other sequences of cyclic movements of the two star wheels 6, 8 are also conceivable, in which more or fewer than two receiving pockets 10 of each star wheel 6, 8 are loaded simultaneously with a container 2. The locations of the receiving positions A and of the discharge positions B are also variable.

The invention claimed is:

1. A device for singulating and passing on upright containers comprising:
   a feed device for transporting the containers in a single row;
   a singulation unit having a first star wheel and a second star wheel, each of the first and second star wheels comprising receiving pockets to accept, when in a first and second receiving position, the containers being transported to them and to transport the containers to a first and second discharge position, wherein the first and second star wheels comprise parallel rotational axes but opposite rotational directions, and wherein the first star wheel comprises a first drive, and the second star wheel comprises a second drive, the first and second star wheels being thus actuatable independently of each other; and
   a pusher unit comprising at least one plunger, which, in an area of the first and second discharge position, is movable back and forth in a direction parallel to the rotational axes of the first and second star wheels and through corresponding receiving pockets.

2. The device of claim 1, wherein the first drive and the second drive are actuatable to produce stepwise movement.

3. The device of claim 1, wherein the first and second drives are actuatable in such a way that, between the first or second receiving position and the first or second discharge position, movements of the receiving pockets of the first star wheel are offset in time from movements of the receiving pockets of the second star wheel.

4. The device of claim 1, wherein the first and second drives are stopped during a pushing operation of the pusher unit in the first and second discharge position, respectively.

5. The device of claim 1, wherein the pusher unit comprises two plungers.

6. The device of claim 5, wherein the two plungers comprise a common third drive.

7. The device of claim 6, wherein the two plungers are connected to each other by a rigid connecting web, as a result of which the two plungers move simultaneously when in the first and second discharge position of the first star wheel and of the second star wheel.

8. The device of claim 6, wherein the third drive is a cam drive.

9. The device of claim 1, wherein the at least one plunger passes completely through the receiving pocket of the associated first or second star wheel during a pushing operation of the pushing unit.

10. The device of claim 1, wherein the singulation unit comprises a housing with side walls, a top, and a bottom, wherein the housing comprises a guide element with two guide surfaces, which laterally enclose the associated first and second star wheels in an area of, respectively, a third and a fourth quadrant of the first and second star wheels, as a result of which the containers are guided in the third and fourth quadrants by the receiving pockets and the guide surfaces.

11. The device of claim 1, further comprising a support plate, on which the containers are supported during rotational movement of the first and second star wheels.

12. The device of claim 11, wherein the support plate comprises pass-through openings in an area of the first and second discharge position.

13. The device of claim 11, wherein the support plate forms an ejection edge in an area of the first and second discharge position.

14. The device of claim 1, further comprising a conveying means for product holders, into which the plungers push the containers during the pushing operation of the pushing unit.

15. A device for singulating and passing on upright containers comprising:
   a feed device for transporting the containers in a single row;
   a singulation unit having a first star wheel and a second star wheel, each of the first and second star wheels comprising receiving pockets to accept, when in a first and second receiving position, the containers being transported to them and to transport the containers to a first and second discharge position, wherein the first and second star wheels comprise parallel rotational axes but opposite rotational directions, and wherein the singulation unit comprises a housing with side walls, a top, and a bottom, wherein the housing comprises a guide element with two guide surfaces, which laterally enclose the associated first and second star wheels in an area of, respectively, a third and a fourth quadrant of the first and second star wheels, as a result of which the containers are guided in the third and fourth quadrants by the receiving pockets and the guide surfaces; and
   a pusher unit comprising at least one plunger, which, in an area of the first and second discharge position, is movable back and forth in a direction parallel to the rotational axes of the first and second star wheels and through corresponding receiving pockets.

16. The device of claim 15, wherein the first star wheel comprises a first drive, and the second star wheel comprises a second drive, the first and second star wheels being thus actuatable independently of each other.

17. The device of claim 15, wherein the first and second drives are actuatable in such a way that, between the first or second receiving position and the first or second discharge position, movements of the receiving pockets of the first star wheel are offset in time from movements of the receiving pockets of the second star wheel.

18. A device for singulating and passing on upright containers comprising:
   a feed device for transporting the containers in a single row;
   a singulation unit having a first star wheel and a second star wheel, each of the first and second star wheels comprising receiving pockets to accept, when in a first and second receiving position, the containers being transported to them and to transport the containers to a first and second discharge position, wherein the first and second star wheels comprise parallel rotational axes but opposite rotational directions;
   a pusher unit comprising at least one plunger, which, in an area of the first and second discharge position, is movable back and forth in a direction parallel to the rotational axes of the first and second star wheels and through corresponding receiving pockets, wherein the pusher unit comprises two plungers, the two plungers comprising a common third drive, and wherein the two plungers are connected to each other by a rigid connecting web, as a result of which the two plungers move simultaneously when in the first and second discharge position of the first star wheel and of the second star wheel.

19. The device of claim 18, wherein the first star wheel comprises a first drive, and the second star wheel comprises a second drive, the first and second star wheels being thus actuatable independently of each other.

* * * * *